United States Patent [19]
Inaba et al.

[11] Patent Number: 5,753,386
[45] Date of Patent: May 19, 1998

[54] HYDROGEN-ABSORBING ALLOY FOR BATTERY AND SECONDARY NICKEL-METAL HYDRIDE BATTERY

[75] Inventors: Takamichi Inaba; Takao Sawa; Shusuke Inada, all of Yokohama; Fumiyuki Kawashima, Matsudo; Noriaki Sato, Yokohama; Toshiya Sakamoto, Yokohama; Masami Okamura, Yokohama; Tomohisa Arai, Yokohama; Keisuke Hashimoto, Yokohama, all of Japan

[73] Assignee: Kabushiki Kaisha Toshiba, Kawasaki, Japan

[21] Appl. No.: 721,057

[22] Filed: Sep. 26, 1996

[30] Foreign Application Priority Data

Sep. 29, 1995 [JP] Japan ................................. 7-252989
Mar. 29, 1996 [JP] Japan ................................. 8-077633

[51] Int. Cl.$^6$ ................................................. H01M 4/38
[52] U.S. Cl. ................... 429/101; 429/59; 429/223; 423/443; 423/900
[58] Field of Search ............................ 420/900, 443; 429/59, 101, 223

[56] References Cited

U.S. PATENT DOCUMENTS

| | | | |
|---|---|---|---|
| 4,946,646 | 8/1990 | Gamo et al. | 420/900 X |
| 5,384,210 | 1/1995 | Furukawa | 429/59 |
| 5,468,260 | 11/1995 | Takee et al. | 429/59 X |
| 5,496,424 | 3/1996 | Fujitani et al. | 420/900 X |

FOREIGN PATENT DOCUMENTS 61-91863  5/1986  Japan.

OTHER PUBLICATIONS

Fujitani et al., "Development of hydrogen–absorbing rare earth—Ni alloys for a –20° C refrigeration system," *Journal of Alloys and Compounds*, 192, 1993, pp. 170–172 (Month Unknown).

Wang et al., "Effects of Al–substitution on hydriding reaction rates of $LaNi_{5-x}Al_x$," *J. Alloys and Compounds*, 191, 1993, pp. 5–7 (Month Unknown).

Van Mal et al., Hydrogen Absorption and Magnetic Properties of $LaCo_{5x}Ni_{5-5x}$ Compounds, *Journal of Less–Common Metals*, 32, 1973, pp. 289–296 (Month Unknown).

*Primary Examiner*—Stephen Kalafut
*Attorney, Agent, or Firm*—Finnegan, Henderson, Farabow, Garrett & Dunner, L.L.P.

[57] ABSTRACT

There is provided a hydrogen-absorbing alloy for battery comprising a rapidly-quenched alloy having the composition represented by a general formula $ANi_aM_bM'_cT_d$ (where, A is composed of La, Ce, Pr, Nd and Y, an amount of La content in A is 50–99 wt %, an amount of Ce content is 1–30 wt %, an amount of Pr content is 0–10 wt %, an amount of Nd content is 0–10 wt % and an amount of Y content is 0–10 wt %; M is at least one element selected from Co, Fe and Cu; M' is at least one element selected from Mn and Al; T is at least one element selected from B, Si, S, Cr, Ga, Ge, Mo, Ru, Rh, Pd, Ag, In, Sn, Sb, Bi, P, V, Nb, Ta and W; and a, b, c and d are atomic ratios and satisfy $3.2 \leq a \leq 4.0$, $0.4 \leq b \leq 1.0$, $0.3 \leq c \leq 0.8$, $0 \leq d \leq 0.2$, $4.9 \leq a+b+c+d \leq 5.4$), characterized in that a hydrogen equilibrium pressure when the number of hydrogen atoms absorbed by one atom of the alloy at a temperature of 60° C. is 0.4 is 0.05–0.6 atm. With the above arrangement, a hydrogen-absorbing alloy capable of realizing a small decrease in capacity under the low-temperature area and high-temperature area, a large electrode capacity in a wide temperature range, and a long life, and a secondary nickel-metal hydride battery using this alloy can be obtained.

7 Claims, 2 Drawing Sheets

HYDROGEN-ABSORBING ALLOY FOR BATTERY AND SECONDARY NICKEL-METAL HYDRIDE BATTERY

BACKGROUND OF THE INVENTION

1. Field of the Invention

The present invention relates to a hydrogen-absorbing alloy for use in a battery and a nickel-metal hydride battery using the alloy and, more specifically, to a hydrogen-absorbing alloy for use in a battery capable of, when applied to a negative electrode of the battery, obtaining a smaller decrease in capacity in a low-temperature range and a high-temperature range and satisfying a high electrode capacity (battery capacity) and long life (long cycle life) after repeated use in a wide use temperature range.

2. Description of the Related Art

Recently, the miniaturization and portability of electronic appliances, which cannot be conventionally expected, has been achieved by the progress of a power saving technology and mounting technology realized by the progress of electronics. Under such a circumstance, a secondary battery used as a power source of these electronic appliances is required to have a large capacity, long life and stabilization of a discharge current.

For example, in the field of the office automation appliances, telephone devices and, audio/visual appliances having been developed for personal use, the development of a battery having a high performance is desired to operate these appliances for a longer time without using a power supply cable. Although a non-sintered type nickel-cadmium battery having the electrode substrate, which is composed of three-dimensional structure, of a conventional sintering type nickel-cadmium battery has been developed, the capacity of this battery has not been remarkably increased.

Thus, there is recently proposed and highlighted a secondary alkaline battery (secondary nickel-metal hydride battery) using the hydrogen absorbing-alloy powder fixed to a collector as a negative electrode. The electrode used in this nickel-metal hydride battery is made by the following procedure. That is, hydrogen-absorbing alloy is melted by a high frequency induction melting method, arc melting method or the like and then cooled and pulverized and the thus obtained pulverized powder is added with an electric conductive agent and binder to form a kneaded material and this kneaded material is coated to or pressingly attached to a collector.

The negative electrode using the hydrogen-absorbing alloy is characterized in that it can not only increase the effective energy density per a unit weight or capacity but also has a less amount of poisonous property and a less possibility of environmental pollution as compared to when cadmium is used as a material for the negative electrode of a conventional typical secondary alkaline battery.

The negative electrode containing the hydrogen-absorbing alloy, however, is immersed into a thick alkaline solution as a battery electrolyte when it is assembled to a secondary battery as well as exposed to oxygen evolved from a positive electrode when the battery is excessively charged, and thus the hydrogen-absorbing alloy is corroded and the electrode characteristics thereof are liable to be deteriorated.

Further, when the battery is charged, hydrogen is absorbed into and released from the hydrogen-absorbing alloy to cause the volume of the alloy to expand and contract, and thus cracks are produced to the hydrogen-absorbing alloy, by which the pulverization of the hydrogen-absorbing alloy is progressed. When the pulverization of the hydrogen-absorbing alloy is progressed, the increase of the specific surface area of the hydrogen-absorbing alloy is accelerated, and thus the ratio of the surface area of the hydrogen-absorbing alloy deteriorated by the alkaline battery electrolyte is increased. Moreover, since the electronic conductivity between the hydrogen-absorbing alloy and the collector is also deteriorated, a cycle life is shortened as well as the electrode characteristics are also deteriorated.

To solve the above problems, there have been proposed such methods as providing the hydrogen-absorbing alloy with a multi-element structure, preventing the direct contact of the hydrogen-absorbing alloy with the battery electrolyte by covering a copper thin film or nickel thin film onto the surface of the hydrogen absorbing-alloy powder or the surface of a negative electrode containing the hydrogen-absorbing alloy by a plating method, using a vapor deposition method or the like to improve the corrosion resistance of the hydrogen-absorbing alloy, preventing cracks by increasing the mechanical strength of the hydrogen-absorbing alloy, or suppressing the deterioration of the surface of the hydrogen-absorbing alloy by drying the same after it has been immersed into an alkaline solution. However, these methods cannot always achieve a sufficient improvement and sometimes lower an electrode capacity on the contrary.

There is an $AB_5$ type alloy represented by $LaNi_5$ as the hydrogen-absorbing alloy used to the secondary alkaline battery. A negative electrode using this series of an alloy having a hexagonal-crystal structure has the feature that it can increase the effective energy density per a unit weight or unit volume of a battery and a battery capacity as well as have a lesser possibility of causing the environmental pollution due to cadmium and the like, and good battery characteristics when compared with the case in which cadmium as a conventional typical negative electrode material for secondary alkaline battery is used. Further, the battery using the $AB_5$ type alloy has an advantage that it can discharge a large current.

However, the $AB_5$ type hydrogen-absorbing alloy composed of Lm-Ni-Co-Al alloy (Lm is referred to as La-rich misch metal) has a low electrode capacity of less than 300 mAh/g and a cycle life determined by charge/discharge is about 200 cycles. The battery using the $AB_5$ type alloy has an advantage that a discharge current can be set to be high. However, the $AB_5$ type alloy does not reach the level for satisfying the electrode capacity and cycle life needed by the recent technical requirements.

Thus, a technology of relatively increasing the content ratio of an A site is also employed to increase the electrode capacity of the battery using the $AB_5$ type hydrogen-absorbing alloy. According to this technology, although the electrode capacity can be increased by about 30%, a drawback arises in that the charge/discharge cycle life is shortened.

Further, there is also employed a technology for increasing the amount of La content in misch metal (Mm: a mixture of rare earth elements containing 10–50 wt % of La, 30–60 wt % of Ce, 2–10 wt % of Pr, 10–45 wt % of Nd and the like) constituting the A component. That is, it is possible to increase the electrode capacity to some extent by using misch metal containing reduced amounts of other rare earth elements and a relatively increased amount of La. In this case, however, it is also difficult to increase the cycle life because any attention is not given to the composition ratio or the like of a plurality of types of rare earth elements.

Of conventional reference characteristics for evaluating a secondary battery, charge capacity, cycle life and discharge voltage are especially regarded as important factors. Of these characteristics, the discharge voltage is almost determined by oxidation reduction reaction of a nickel oxide at a positive electrode and hydrogen reaction at a negative electrode in a secondary nickel-metal hydride battery. For this reason, even if hydrogen-absorbing alloy is improved, a large change in discharge voltage rarely occurs. On the other hand, as battery characteristics which are considerably improved by actually improving the hydrogen-absorbing alloy, two leading characteristics, i.e., a discharge capacity and a cycle life, are used.

In addition to these characteristics, as battery characteristics which are improved by improving the hydrogen-absorbing alloy, capacity rising-up characteristics (easiness of activation) are known. More specifically, in the characteristics, a high electrode capacity can be immediately obtained after an activating operation (charge/discharge operation) of several cycles is repeated after the battery has been assembled.

Although the capacity rising-up characteristics need not be given attention when the battery is used as a product by an user, when the capacity rising-up characteristics are defective, the number of steps in manufacturing a battery increases to cause the production cost of the battery to increase. For this reason, the capacity rising-up characteristics are one of characteristics which are regarded as important when a battery design is performed by a battery manufacturer.

When a battery mounted on a hand-held camera recorder or cellular phone serving as conventional main applications is improved with respect to the above three leading characteristics, i.e., the discharge capacity, the cycle life and the capacity rising-up characteristics, a battery which sufficiently satisfies final user's requests can be obtained, and the production cost of the battery itself can be reduced.

However, as use of portable appliances rapidly spreads, a request for long life of batteries serving as drive power sources of appliances further increases. The cycle life of a conventional battery has not been able to easily cope with this request.

In a nickel-metal hydride battery using the conventional hydrogen-absorbing alloy as a negative electrode material, a battery capacity conspicuously decreases in an upper-limit temperature range and a lower-limit temperature range in a temperature range (−20° C. to +80° C.) in which the battery is used. Depending on a case, the battery may not cause discharge, and a battery function is remarkably degraded. That is, when the battery is used in a cold district, voltage drop increases to cause a malfunction. On the other hand, when the battery generates heat in a charging operation to be heated to a high temperature, a decrease in capacity is conspicuous. In any cases, the operation reliability of an appliance in which the battery is used is considerably degraded.

SUMMARY OF THE INVENTION

The present invention has been made to solve the above problems, and has as its object to provide a hydrogen-absorbing alloy for use in a battery and capable of obtaining a less decrease in capacity in a low-temperature range and a high-temperature range, obtaining a large capacity in a wide use temperature range and realizing long life of the battery and a nickel-metal hydride battery using this alloy.

To achieve the object, the inventors wholeheartedly studied a hydrogen-absorbing alloy suitable for battery operation environment such that an equilibrium pressure of the battery was kept correct, and high corrosion resistance could be kept even if the nickel-metal hydride battery was dipped in a strong-alkaline battery electrolyte.

As a result, when a molten alloy having a specific composition which formed an intermetallic compound having a so-called $CaCu_5$ type crystal structure, i.e., composed of a so-called $AB_5$ type alloy as a base was rapidly quenched, a knowledge as described below was obtained. That is, a hydrogen-absorbing alloy having excellent hydrogen-absorbing characteristics and high corrosion resistance could be obtained, and a secondary nickel-metal hydride battery having an electrode capacity, life characteristics and the temperature characteristics of the capacitor with good equilibrium can be obtained. The present invention has been completed on the basis of the above knowledge.

More specifically, a hydrogen-absorbing alloy for use in a battery according to the first invention of this application comprises a rapidly-quenched alloy having the composition represented by a general formula of $ANi_aM_bM'_cT_d$ (where, A is composed of La, Ce, Pr, Nd and Y, an amount of La content in A is 50–99 wt %, an amount of Ce content is 1–30 wt %, an amount of Pr content is 0–10 wt %, an amount of Nd content is 0–10 wt % and an amount of Y content is 0–10 wt %; M is at least one element selected from Co, Fe and Cu; M' is at least one element selected from Mn and Al; T is at least one element selected from B, Si, S, Cr, Ga, Ge, Mo, Ru, Rh, Pd, Ag, In, Sn, Sb, Bi, P, V, Nb, Ta and W; and a, b, c and d are atomic ratios and satisfy $3.2 \leq a \leq 4.0$, $0.4 \leq b \leq 1.5$, $0.3 \leq c \leq 0.9$, $0 \leq d \leq 0.2$, $4.5 \leq a+b+c+d \leq 5.6$), characterized in that a hydrogen equilibrium pressure when the number of hydrogen atoms absorbed by one atom of the alloy at a temperature of 60° C. is 0.4 is 0.05–0.6 atm.

The sum of the atomic ratios a, b, c and d is preferably set within the range of 4.9–5.4. The hydrogen-absorbing alloy preferably contains 0.5–1.5 of Co, 0.1–0.5 of Mn and 0.1–0.4 of Al as atomic ratios. The average crystal grain size of the rapidly-quenched alloy is preferably set within the range of 5–100 μm.

A hydrogen-absorbing alloy for use in a battery according to the second invention of this application is characterized by comprising an alloy having the composition represented by a general formula of $AB_x$ (where, A is composed of La, Ce, Pr and Nd, an amount of La content in A is 70–90 wt % and an amount of Nd content is not more than 5 wt %; and B is at least one element selected from Ni, Co, Fe, Cr, Mn, Cu, Al, Ga, Si, Ge, Bi, Sn, In, P, V, Nb, Ta, Mo and W; and x is an atomic ratio which satisfies $4.5 \leq x \leq 5.6$).

Each hydrogen-absorbing alloy for battery according to the present invention is manufactured such that a molten alloy having the above predetermined composition is brought into contact with a cooling member to rapidly quench and solidify the molten alloy at a cooling rate of 100° C./sec or more. In this rapidly-quenching/solidifying treatment, additive components are uniformly dispersed in the alloy structure for the first time, and an inter-granular precipitation phase is finely granulated, thereby obtaining a long-life battery.

To remove internal distortion of the alloy prepared by the above molten-metal-rapidly-quenching method, a homogenizing heat treatment in which an alloy is heated at a temperature of 300°–1,000° C. in a non-oxidization atmosphere for 2 to 10 hours is preferably performed.

A secondary nickel-metal hydride battery according to the present invention is characterized in that a negative electrode containing a hydrogen-absorbing alloy having the predetermined component and a positive electrode containing a nickel oxide are disposed through a separator having electric insulating properties and contained in an air-tight container filled with an alkaline battery electrolyte.

In the hydrogen-absorbing alloy for use in a battery according to the first and second inventions of this application, A in the general formula is an element for hydrogen-absorbing capability serving as the base of a large-capacity battery, and an amount of A content is determined by the ratio of the value (a+b+c+d) or the value X in consideration of the equilibrium between the capacity and the life of the battery.

In the alloy according to the first invention of this application, A is a misch metal composed of La, Ce, Pr, Nd and Y. Among these elements, La is especially effective to obtain a large capacity. An amount of La content in the entire A component is set to 50–99 wt %, an amount of Ce content is set to 1–30 wt %, an amount of Pr content is set to 0–10 wt %, an amount of Nd content is set to 0–10 wt %, and an amount of Y content is set to 0–10 wt %.

More specifically, when the La content in the misch metal is less than 50 wt %, an increase in capacity of the battery is insufficient; and when the La content exceeds 99 wt %, the cycle life of the battery is shortened. When the Ce content is less than 1 wt %, the cycle life is shortened; when the Ce content exceeds 30 wt %, life characteristics are not sufficient. For this reason, the Pr content and the Y content in the misch metal are set to 10 wt % or less, respectively. Since life characteristics are insufficient when the Nd content exceeds 10 wt %, the Nd content is set to 10 wt % or less.

The components such as Ni, M, M' and T are used to obtain a catalyst function on alloy boundaries, adjustment of a hydrogen equilibrium pressure and improvement on life characteristics, and the total content represented by (a+b+c+d) is set within the range of 4.5–5.6. When (a+b+c+d) is smaller than 4.5, the improvement effect is insufficient; when the atomic ratio exceeds 5.6, a battery capacity is excessively small, and the basic required characteristics of a battery cannot be easily satisfied. Therefore, the total content (a+b+c+d) is more preferably set within the range of 4.9–5.4.

Of the above components, Ni is a basic element which is alloyed with a rare earth component (A) to form a rare earth-Ni type hydrogen-absorbing alloy to absorb/release hydrogen. Ni is added such that an atomic ratio of a is set within the range of 3.2–4.0. In the range of the atomic ratio of Ni, although a hydrogen-absorbing equilibrium pressure in an air-tight type battery can be properly set, the Ni content is more preferably set within the range of 3.3–3.9.

M is at least one element selected from Co, Fe and Cu. All the elements improve the corrosion resistance of the alloy, effectively suppress generation of cracks caused by expansion of lattice in a hydrogen absorbing operation and perform an effect for increasing life. When the atomic ratio b of the M component is less than 0.4, the effect for increasing the life is insufficient; when the ratio b exceeds 1.5, a decrease in capacity is conspicuous.

M' is at least one element selected from Mn, Al and Si. All the elements contribute to improvement on the life of the alloy. When the atomic ratio c of the M' component is less than 0.3, the above improvement rarely exhibited; when the ratio c exceeds 0.9, a hydrogen equilibrium pressure is excessively low and is not suitable for practical use.

T is at least one element selected from B, Si, S, Cr, Ga, Ge, Mo, Ru, Rh, Pd, Ag, In, Sn, Sb, Bi, P, V, Nb, Ta and W.

All the elements are effective to improve the life of the alloy. When the atomic ratio d of the T component exceeds 0.2, the capacity of the battery decreases.

In the general formula $ANi_aM_bM'_cT_d$ of the hydrogen-absorbing alloy for battery according to the first invention of this application, assume that $Ni_aM_bM'_cT_d$ is represented by B site and that (a+b+c+d) is represented by X. In this case, the hydrogen-absorbing alloy according to the present invention is represented by a general formula $AB_x$, and is an $AB_5$ type alloy in which the composition ratio X of B site is set within the range of 4.5–5.6. When the composition ratio X of B site is out of the above range, a production amount of phase other than the phase of $AB_{4.5-5.6}$ (for example, a phase composed of AB, $AB_3$, $A_2B_7$ or the like, or a phase composed of a single element constituting B site [to be referred to as the second phase hereinafter]) increases in the alloy.

When the second phase other than the phase composed of the $AB_x$ increases in the alloy, the probability of contact between alloy phases having two or more different types of components including the second phase increases. Such boundaries between the alloy phases having different types of components has low mechanical strength, and cracks extending from the boundaries and caused by absorbing/releasing hydrogen are easily made.

In the boundaries, segregation easily occurs, corrosion of the hydrogen-absorbing alloy easily occurs from the segregation product. Under the electrode use conditions, the second phase absorbs a smaller amount of hydrogen than that of $AB_x$. When the alloy containing a large amount of second phase is used as an electrode, the electrode capacity per unit volume decreases. In any cases, when the hydrogen-absorbing alloy is used as an electrode material, the electrode capacity and cycle life are decreased.

As a result, the reason why the value X is limited is as follows. When the value X is less than the lower limit value (4.5), a hydrogen-absorbing alloy in which corrosion in a charge/discharge operation is small, and crack or pulverization of the alloy is not easily made cannot be obtained. On the other hand, when the value X exceeds the upper limit value (5.6), the second phase is generated depending on the alloy producing method which can be normally employed in the industrial field, and the characteristics of the hydrogen-absorbing alloy cannot be improved. Therefore, the value X is set within the range of 4.5–5.6 and more preferably the range of 4.9–5.4.

Mn in the M' component is effective to increase the capacity of the negative electrode containing the hydrogen-absorbing alloy, improve corrosion resistance by enhancing formation of a passive-state film and reduce a hydrogen absorption/release pressure (equilibrium pressure). Al has a function of decreasing a hydrogen absorption/release pressure (dissociation pressure) to an operation pressure which is suitable for an air-tight type battery in the same way as M' as well as can increase durability.

When the Mn and Al contents are less than 0.3 as an atomic ratio, respectively, the above improvement effect is insufficient; when the contents exceed 0.9, respectively, the capacity considerably decreases. Therefore, the content of at least one of Mn and Al is set within the range of 0.3–0.9.

Further, Co as the M component is effective to improve the corrosion resistance of the alloy against a battery electrolyte and the like, and the pulverization of the alloy is greatly suppressed by it. More specifically, when the substituted amount of Co is increased, the cycle life is increased but there is the tendency that the electrode capacity is lowered, and thus the substituted amount of Co must be optimized in accordance with the application of battery. Although the substituted amount of Co is related to the composition ratio of rare earth elements serving as A site components, the substituted amount of Co is preferably set within the range of 0.4 to 1.5 as an atomic ratio with respect to the composition range of the A site components ruled by the present invention.

When the substituted amount of Co is less than 0.4 as an atomic ratio, an effect for increasing the life is insufficient; when the substituted amount of Co exceeds 1.5, a decrease in capacity is conspicuous. In any cases, the two leading required characteristics of a battery cannot be easily satisfied. From the above view point, as the B components of the hydrogen-absorbing alloy of the present invention, Co and Mn are preferably added at predetermined amounts or more as atomic ratios.

In the hydrogen-absorbing alloy for battery according to the second invention of this application, A of the general formula $AB_x$ is composed of La, Ce, Pr and Nd. An amount of La content in the A component as a whole is set within the range of 70–90 wt %, and an amount of Nd content is set to 5 wt % or less. More specifically, when the La content is more than 70 wt %, an increase in capacity of the battery is sufficient; when the La content is within 90 wt %, the life of the battery is sufficiently long. Since life characteristics are sufficient when the Nb content is within 5 wt %, the Nb content is set to 5 wt % or less.

The B component such as Ni, Co, Mn and Al is a component which is effective to obtain a catalyst function on the alloy boundaries, adjustment of a hydrogen equilibrium pressure and improvement on life characteristics. The B content is set within the range of 4.5 to 5.6 as an atomic ratio X. When the atomic ratio X is less than 4.5, the above improvement effect is insufficient; when the atomic ratio exceeds 5.6, the battery capacity is excessively small, and the basic required characteristics of the battery cannot be easily satisfied.

The hydrogen-absorbing alloy for battery according to the second invention of this application is represented by a general formula $AB_x$ and is an $AB_5$ type alloy in which the composition ratio X of B site is set within the range of 4.5–5.6. When the composition ratio X of B site is out of the above range, a production amount of the secondary phase other than the phase of $AB_{4.5-5.6}$ increases in the alloy.

When the value X is less than the lower limit value (4.5), a hydrogen-absorbing alloy in which corrosion in a charge/discharge operation is small, and crack or pulverization of the alloy is not easily made cannot be obtained. On the other hand, when the value X exceeds the upper limit value (5.6), the second phase is generated depending on the alloy producing method which can be normally employed in the industrial field, and the characteristics of the hydrogen-absorbing alloy cannot be improved. Therefore, the value X is set within the range of 4.5–5.6.

The B component in the general formula $AB_x$ is at least one element selected from Ni, Co, Mn, Al, Fe, Si, Cr, Cu, Bi, P, V, Nb, Ta, Mo, W, Ga, In, Ge and Sn. These elements are effective to properly set a hydrogen absorption/release equilibrium pressure, extend the life of the alloy and increase the electrode characteristics. Among the elements serving as the B component, Co, Al, Fe, Si, Cr and Cu are especially effective to increase the life of the hydrogen-absorbing alloy.

In addition, the hydrogen-absorbing alloy according to the present invention may contain elements of Pb, C, N, O, F and Cl as an impurity as far as they do not inhibit the characteristics of the alloy of the present invention. The content of the impurity is preferably in the range of 6,000 ppm or less, more preferably, the range of 5,000 ppm or less and still more preferably 4,000 ppm or less.

When the molten alloy having the composition represented by the above general formula is rapidly quenched and solidified under predetermined conditions, a hydrogen-absorbing alloy having a hydrogen equilibrium pressure set within a limited range, a large capacity which can be kept in a wide temperature range when the alloy is used as a negative electrode material of the battery and a low temperature dependency can be obtained. More specifically, the hydrogen equilibrium pressure of the alloy having a low temperature dependency is in the range of 0.05–0.6 atm as a criterion for evaluation at a temperature of 60° C.

In this case, the hydrogen equilibrium pressure is a hydrogen pressure obtained when the number of hydrogen atoms absorbed per one metal atom is 0.4. When the hydrogen equilibrium pressure is less than 0.05 atm, the battery voltage is excessively lowered, and a discharge capacity decreases under the low-temperature use condition, especially, at 0° C. or less. On the other hand, the hydrogen equilibrium pressure exceeds 0.6 atm, a decrease in capacity at a high temperature, e.g., 80° C. or higher, increases, and the battery cannot be easily used under the high-temperature condition.

In the hydrogen-absorbing alloy according to the present invention, the molten alloy having the predetermined composition is subjected to a rapidly-quenching treatment to prepare the alloy. For this reason, crystal grains constituting the alloy structure are finely granulated, a path required for absorption/release of hydrogen is sufficiently assured. The absorption/release of hydrogen easily progresses through this path. That is, since a moving method of hydrogen is slightly dependent on in-alloy diffusion which is easily influenced by temperature, a decrease in capacity can be effectively suppressed even under the low-temperature condition at 0° C. or lower and the high-temperature condition at higher than 60° C. As a result, a hydrogen-absorbing alloy having a low temperature dependency can be obtained.

A method of manufacturing the hydrogen-absorbing alloy for battery according to the present invention is not particularly limited so long as it can make a uniform alloy composition and prevent segregations. More specifically, a material mixture prepared to have a predetermined component is heated by an arc furnace or the like, and then the molten alloy is cooled and solidified by using a normal casting method, a gas atomizing method, a rotating disc method, a centrifugal spraying method, a single roll method, a double roll method or the like to form the alloy.

In cooling the molten alloy, the cooling rate is set to 100° C./sec or more, preferably 300° C./sec or more and more preferably, 1,800° C./sec or more. In this case, even if a relatively large amount of La is contained in the alloy material as a misch metal, an alloy having a uniform structure and a less amount of segregations can be obtained.

As a cooling-solidifying method for the molten alloy, a method of pouring the molten alloy onto a Cu disc cooled with water to manufacture an alloy block having a thickness of about 10–50 mm may be used. After this cooling-solidifying method and a heat treatment (to be described later) are performed, a hydrogen-absorbing alloy for battery having a large capacity and a long life can be obtained.

When the molten alloy is injected onto a cooling member which moves at a high speed to form a flake-shaped alloy having a thickness of about 20–500 μm, a hydrogen-absorbing alloy composed of fine crystal grains each having about 1–100 µm can be obtained, thereby forming a battery having a large capacity and a long life. When the crystal grains are finely granulated, the hydrogen absorbing rate of the alloy increases. The rising-up speed of the discharge capacity is high when the alloy is used as material for a secondary battery.

Further, the hydrogen-absorbing alloy can be stably manufactured in a large amount by using a molten-metal-rapidly-quenching method such as a gas atomizing method, a rotating disc method, a centrifugal spraying method, a single roll method or a double roll method of rapidly quenching a molten alloy in a melt state as a cooling-solidifying method for a molten alloy and by optimizing the material and surface properties of a cooling roll(s), rotating speed of the cooling roll(s) (peripheral speed of the traveling surface thereof), a molten alloy temperature, kind of gas in cooling chamber, pressure, the diameter of a nozzle for molten alloy injection, amount of the molten alloy to be injected or the like.

Single Roll Method

FIG. 1 shows a hydrogen-absorbing alloy manufacturing apparatus using the single roll method. This manufacturing apparatus comprises a cooling roll 5 composed of copper, nickel or the like excellent in thermal conductivity and having a diameter of about 400 mm and a molten metal injection nozzle 4 for injecting a molten hydrogen-absorbing alloy 3 supplied from a ladle 2 to the traveling surface of the cooling roll 5 after storing the same. The cooling roll 5 and the like are accommodated in a cooling chamber 1 adjusted to an inert gas atmosphere. Further, although the rotating speed of the cooling roll 5 depends upon the wetting property thereof, cooling speed and an injection amount of the molten hydrogen-absorbing alloy 3, it is generally set to 300–5,000 rpm.

In the aforesaid manufacturing apparatus shown in FIG. 1, when the molten hydrogen-absorbing alloy 3 supplied from the ladle 2 is injected onto the traveling surface of the cooling roll 5 through the molten metal injection nozzle 4, the molten alloy is solidified from the surface thereof in contact with the cooling roll 5, crystals begin to grow and the solidification of the molten metal is perfectly completed before it leaves from the cooling roll 5. Thereafter, the molten metal is further cooled while it flies in the cooling chamber 1 so that a hydrogen-absorbing alloy 6 is made which has a less amount of segregations and crystals uniformly grown in the same direction.

Double Roll Method

FIG. 2 shows a hydrogen-absorbing alloy manufacturing apparatus using the double roll method. This manufacturing apparatus comprises a pair or more of cooling rolls 5a, 5b disposed in a cooling chamber 1 so that the respective traveling surfaces thereof are confronted to each other, a melting surface 7 for preparing a molten hydrogen-absorbing alloy 3 by melting material metals, and a molten metal injection nozzle 4 for injecting the molten hydrogen-absorbing alloy 3 supplied from the melting furnace 7 between the cooling rolls 5a, 5b through a tundish 8.

The cooling rolls 5a, 5b are composed of a material excellent in thermal conductivity such as copper, nickel or the like and having a diameter of about 300 mm. These cooling rolls 5a, 5b are rotated at a high speed of about 300–2,000 rpm while keeping a fine gap d of about 0–0.5 mm therebetween. Note, although traveling surfaces of the cooling rolls are parallel to each other as shown in FIG. 2, a so-called shape roll in which the cross section of the traveling surface thereof is formed to a U-shape or V-shape may be employed. Further, when the gap d between the cooling rolls 5a, 5b is excessively large, since the molten alloy is not cooled in the same direction and as a result a hydrogen-absorbing alloy having a structure whose growing direction is disturbed is made, the gap d is preferably set to 0.2 mm or less.

In the aforesaid manufacturing apparatus shown in FIG. 2, when the molten hydrogen-absorbing alloy 3 is injected in the direction between the cooling rolls 5a, 5b from the molten metal injection nozzle 4, the molten alloy is solidified from the sides thereof in contact with the cooling roll 5a, 5b on the both sides, crystals begin to be grown and the solidification of the molten metal is perfectly completed before it leaves from the cooling rolls 5a, 5b. Thereafter, the molten metal is further cooled while it flies in the cooling chamber 1 so that a hydrogen-absorbing alloy 6 is made which has a less amount of segregations and crystals grown in the same direction.

When a block-shaped, ribbon-shaped, flake-shaped or particle-shaped hydrogen-absorbing alloy is made by using the aforesaid cooling-solidifying method, equi-axed crystals and columnar structure are made in an alloy structure depending upon the conditions of the material of the cooling roll and rotary disk, a supply amount of a molten alloy and the like.

In the steps in manufacturing the alloy particles, when a hydrogen-absorbing alloy is made by rapidly quenching the molten metal at a quenching rate of 100° C./sec or more, preferably 300° C./sec or more and more preferably 1,800° C./sec or more, respective crystal particles constituting the alloy are finely crystallized to about 5 to 100 µm so that the strength of the alloy is increased and disturbance of particle boundaries is reduced, and thus an amount of hydrogen to be absorbed is increased and the electrode capacity can be increased.

According to the molten-metal-rapidly-quenching method, a hydrogen-absorbing alloy in which a columnar structure is partially developed can be formed. Here, the columnar structure is defined as columnar crystal particles having a ratio of minor diameter to major diameter (aspect ratio) of 1:(2 or higher). It has been confirmed by the experiment effected by the inventors that since the columnar structure has crystals grown in the same direction different from those in the equi-axed crystal structure, grain boundaries are less disturbed, and amount of hydrogen to be absorbed is increased and the electrode capacity can be increased.

More specifically, in the columnar structure, since the paths of hydrogen molecules or hydrogen atoms are formed along the boundaries of the columnar structure, hydrogen can be easily absorbed to and released from the alloy to thereby increase the electrode capacity. Further, segregations are greatly reduced in the columnar structure. Therefore, a local battery is not formed by the segregations and the reduction of life due to the pulverization of the alloy can be effectively prevented.

Internal distortion easily occurs in the alloy prepared by the cooling-solidifying method as described above. On the other hand, segregations easily occur in an alloy prepared by a casting method. In any cases, when an alloy is used as a negative electrode material, an electrode capacity and life are frequently reduced.

Thus, depending on the condition, the alloy prepared by the cooling-quenching method is desirably subjected to a homogenization heat treatment in advance such that the alloy is heated at a temperature of 300°–1,100° C. for 1–24 hours.

When the temperature of the homogenization heat treatment is lower than 300° C., the internal distortion is difficult to be removed, whereas when it exceeds 1,100° C., the composition of the alloy is changed by the evaporation or oxidation of the alloy components such as Mn and the like or an IV group element, and an alloy strength is lowered by a secondary recrystalization. Therefore, the heat treatment temperature is set to the range of 300°–1,100° C. In particular, the range of 500°–900° C. is preferable to improve electrode characteristics.

Further, when the heat treatment time is shorter than one hour, the effect for removing the internal distortion is reduced. On the other hand, when the heat treatment is executed for a time longer than 24 hours, there is a possibility that the size of crystal particles is increased, and thus the heat treatment time is preferably about 2–15 hours by taking a manufacturing efficiency into consideration.

Note, the heat treatment atmosphere is preferably composed of an inert gas such as Ar or vacuum to prevent the oxidation of the hydrogen-absorbing alloy at a high temperature.

The initial distortion of the hydrogen-absorbing alloy can be effectively removed by the homogenization heat treatment effected under the above conditions while keeping the homogeneity thereof, and thus the electrode capacity and life can be further extended.

When the following surface treatment is performed to the hydrogen-absorbing alloy prepared as described above, the electrode characteristics can be improved when the hydrogen-absorbing alloy is used as an electrode material. That is, when a surface treatment such as an oxidation treatment, an alkaline treatment, a fluoride treatment or the like is performed to the hydrogen-absorbing alloy, the activity and corrosion resistance of the alloy surface can be improved. Among the surface treatments, the alkaline treatment using KOH or NaOH is especially effective. These surface treatments may be performed to the alloy having a shape obtained after the alloy is rapidly quenched and solidified. These treatments may be performed in a state after pulverization or a state during pulverization.

A secondary nickel-metal hydride battery (cylindrical secondary nickel-metal hydride battery) according to the present invention using the hydrogen-absorbing alloy for battery as a negative electrode active material will be described below with reference to FIG. 3.

The secondary nickel-metal hydride battery according to the present invention is constituted such that a negative electrode 11 containing a hydrogen-absorbing alloy for battery represented by the aforesaid general formula of $ANi_aM_bM'_cT_d$ or $AB_x$ and a positive electrode 12 containing a nickel oxide are disposed through a separator 13 having electric insulating properties and contained in an air-tight container 14 filled with an alkaline battery electrolyte.

More specifically, the hydrogen absorbing-alloy electrode (negative electrode) 11 containing an hydrogen-absorbing alloy is wound with a non-sintered type nickel electrode (positive electrode) 12 to a spiral-shape with the separator 13 disposed therebetween and contained in the cylindrical container 14 having a bottom. An alkaline battery electrolyte is contained in the container 14. A disc-shaped opening seal plate 16 having a hole 15 defined at the center thereof is disposed on the upper opening of the container 14. A ring-shaped insulating gasket 17 is interposed between the peripheral edge of the seal plate 16 and the inner surface of the upper opening of the container 14 to fix the opening seal plate 16 to the container 14 in a gas-tight state through the gasket 17 by narrowing the diameter of the above upper opening inwardly by caulking. A positive electrode lead 18 has an end connected to the positive electrode 12 and the other end connected to the lower surface of the opening seal plate 16. A hat-shaped positive electrode terminal 19 is mounted on the opening seal plate 16 to cover the hole 15. A rubber safety valve 20 is disposed in the space surrounded by the opening seal plate 16 and the positive electrode terminal 19 to close the hole 15. An insulating tube 21 is attached to the vicinity of the upper end of the container 14 to fix the positive electrode terminal 19 and a collar 22 disposed on the upper end of the container 14.

The above hydrogen absorbing-alloy electrode 11 includes a paste type and a non-paste type as described below:

(1) a paste type hydrogen absorbing-alloy electrode is made in such a manner that a hydrogen absorbing-alloy powder obtained by pulverizing the above hydrogen-absorbing alloy, a polymer binder and an electric conductive powder added when necessary are mixed to make a paste and the paste is coated to and filled with an electric conductive substrate as a collector and dried and then pressed by a roller press or the like; and (2) a non-paste type hydrogen absorbing-alloy electrode is made in such a manner that the hydrogen absorbing-alloy powder, polymer binder and electric conductive powder added when necessary are stirred and dispersed to the electric conductive substrate as a collector and then pressed by a roller press or the like.

As a method of pulverizing the hydrogen-absorbing alloy, there are employed a mechanical pulverizing method effected by a ball mill, pulverizer, jet mill or the like and a method of causing the hydrogen-absorbing alloy to absorb/release high pressure hydrogen and pulverizing the same by the expansion of the volume thereof at the time.

The polymer binder includes, for example, sodium polyacrylate, polytetrafluoroethylene (PTFE), carboxymethyl cellulose (CMC), polyvinyl alcohol (PVA) and the like. Each of these polymer binders in the range of 0.1–5 weight parts is preferably combined with 100 weight parts of the hydrogen-absorbing alloy. When, however, the non-paste type hydrogen absorbing-alloy electrode of the above item (2) is to be made, polytetrafluoroethylene (PTFE) is preferably used as the polymer binder because PTFE is made to fibers by being stirred and can fix the hydrogen absorbing-alloy powder and the electric conductive powder added when necessary to a three-dimensional state (mesh-state).

The electric conductive powder includes, for example, a carbon powder such as a graphite powder, kitchen black and the like and a metal powder such as a nickel powder, copper powder, cobalt powder and the like. Each of these electric conductive powders in the range of 0.1–5 weight parts is preferably combined with 100 weight parts of the hydrogen-absorbing alloy.

The electric conductive substrate includes, for example, a two-dimensional substrate such as a punched metal, expanded metal, wire net and the like and a three-dimensional substrate such as a foamed metal substrate, net-shaped sintered fiber substrate, plated-felt substrate composed of a non-woven fabric to which metal is plated and the like. When however, the non-paste type hydrogen absorbing-alloy electrode of the above item (2) is made, the two-dimensional substrate is preferably used as the electric conductive substrate because a combined material containing the hydrogen absorbing-alloy powder is dispersed.

The non-sintered type nickel electrode 12 combined with the hydrogen absorbing-alloy electrode is made in such a manner that a paste is prepared by suitably combining the mixture of nickel hydride, cobalt hydroxide ($Co(OH)_2$) added when necessary and cobalt monoxide (CoO), metallic cobalt and the like with polyacrylate such as carboxymethyl cellulose (CMC), sodium polyacrylate and the like, and the paste is filled with the three-dimensional structure such as the foamed metal substrate, net-shaped sintered fiber substrate plated-felt substrate composed of the non-woven fabric to which metal is plated and the like and dried and then pressed by the roller press or the like.

A non-woven fabric composed of polymer fibers used as the separator 13 includes simple polymer fibers such as nylon, polypropylene, polyethylene and the like and complex polymer fibers mixed with these polymer fibers.

Used as the alkaline battery electrolyte is, for example, a 6N to 9N potassium hydroxide solution or the potassium hydroxide solution mixed with lithium hydroxide, sodium hydroxide or the like.

According to the hydrogen-absorbing alloy for battery with the above arrangement, since the types of rare earth elements constituting the alloy and the composition ratio of the rare earth elements and the type of an element to be substituted for Ni and the composition ratio of the element are properly set, a hydrogen-absorbing alloy for battery having excellent hydrogen-absorbing characteristics and good corrosion resistance can be obtained.

Therefore, when the alloy is used as a negative electrode material, a battery capacity is increased, and the degradation of the alloy due to the pulverization of the alloy caused by an alkaline battery electrolyte can be effectively prevented. For this reason, a secondary nickel-metal hydride battery having a long life can be provided.

DESCRIPTION OF THE PREFERRED EMBODIMENTS

Embodiments of the present invention will be described below more specifically.
Embodiments 1–23

Various metal material powders were mixed with each other to obtain A component (rear earth elements) composition and alloy compositions shown in left columns of Table 1. Then, the obtained mixtures of various materials were heated and melted in a vacuum furnace to prepare molten alloys (mother alloys) for respective embodiments.

The obtained molten alloys were cooled and solidified in an Ar atmosphere in accordance with the following conditions to prepare block-shaped or flake-shaped alloy specimens.

Figure 1:
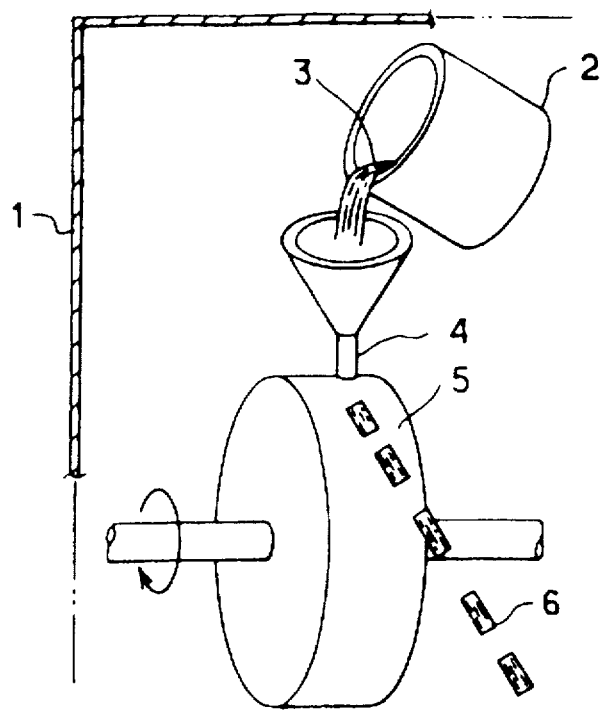
FIG. 1 is a perspective diagram showing a hydrogen-absorbing alloy manufacturing apparatus using a single roll method.

More specifically, the molten alloys for Embodiments 1–15 were rapidly quenched and solidified by a single roll method as shown in FIG. 1 to prepare respective flake-shaped alloy specimens. A Cu-Be roll having a diameter of 400 mm was used as a cooling roll, the gap between a molten-pouring nozzle (injection nozzle) was set to 10 mm, and an injection pressure was set to 0.5 $kg/cm^2$. The rapidly-quenching operation was performed in an Ar atmosphere, and the peripheral speed of the roll was set to 25 m/s.

Figure 2:
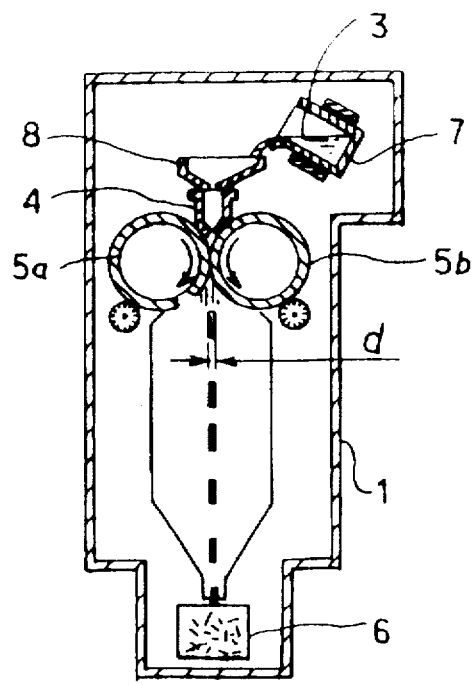
FIG. 2 is a sectional diagram showing the arrangement of a hydrogen-absorbing alloy manufacturing apparatus using a double roll method.
Figure 3:
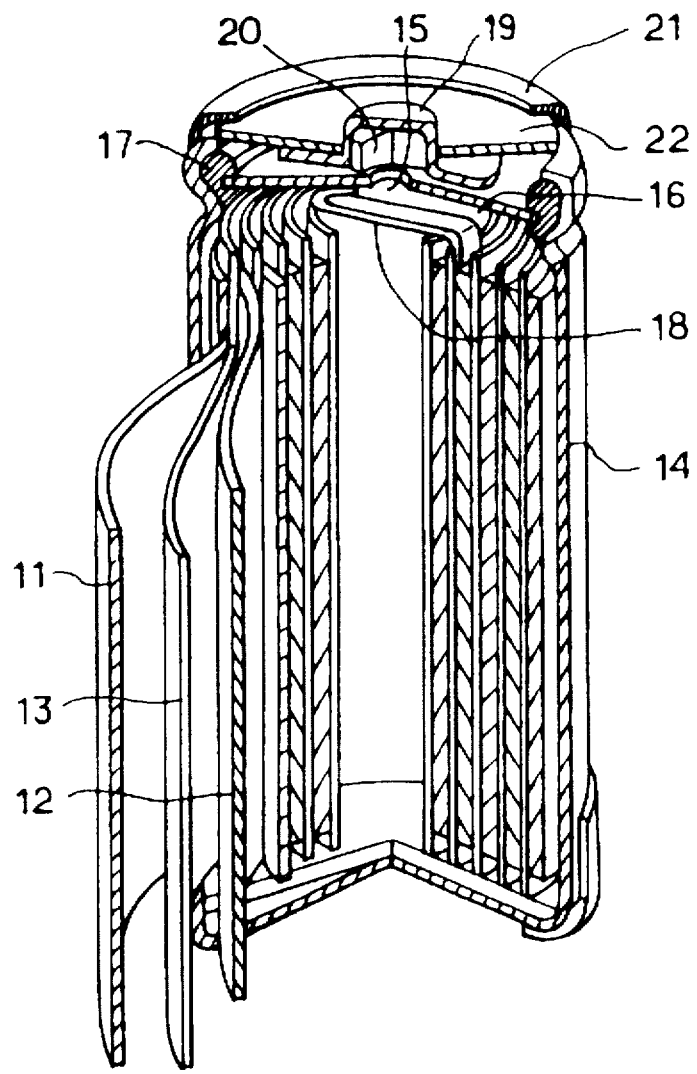
FIG. 3 is a partially-cutaway perspective diagram showing an arrangement of a secondary nickel-metal hydride battery according to the present invention.

On the other hand, the molten alloys for Embodiments 16–23 were rapidly quenched and solidified by a double roll method as shown in FIG. 2 to prepare respective flake-shaped alloy specimens. A treatment atmosphere in the double roll method was an Ar gas atmosphere as in case of the single roll method. The material of the cooling rolls was Fe (SUJ-2), and iron rolls each having a diameter of 300 mm were used. The roll gap between the cooling rolls was set to zero, the peripheral speed of each roll was set to 10 m/s, and an injection pressure was set to 0.5 $kg/cm^2$.

Among the rapidly-quenched alloy specimens, the rapidly-quenched alloy specimens manufactured by the single roll method and the double roll method were flake-shapes, and their thicknesses were 150–200 μm. These flake-shaped alloy specimens were subjected to a homogenization heat treatment at 1,000° C. for 10 hours to remove internal distortion therefrom.
Comparative Example 1–2

Material powders were mixed with each other to satisfy misch metal (A) compositions and alloy compositions shown in left columns in Table 1. Then, the obtained mixtures of material powders were heated and melted in a vacuum furnace to prepare molten alloys for respective comparative examples. Note, among the material powders, as a misch metal (A) serving as the A component, a misch metal whose La content was excessively small and Nd content was excessively large and a misch metal whose La content was excessively small and Ce and Pr contents were excessively large were used.

The obtained molten alloys were cooled and solidified by a casting method at a quenching rate set to 0.1°–1° C./sec to prepare block-like alloy specimens each having a thickness of 50 mm according to Comparative Examples 1 and 2. Further, the obtained alloy specimens were heated at 1.000° C. for 10 hours to perform a homogenization heat treatment to the alloy specimens.

The obtained alloy specimens were pulverized by a hammer mill, and the pulverized powders were screened to be classified into powders having a grain size of 75 μm or less, thereby obtaining hydrogen absorbing-alloy powders for battery. Note that the average grain size was 35–40 μm.

To evaluate the characteristics of the hydrogen-absorbing alloys for battery according to the above embodiments and comparative examples serving as battery materials, the hydrogen-absorbing alloys for battery were used to form electrodes, and the hydrogen equilibrium pressure, electrode capacities, and the numbers of charge/discharge cycles (life cycles) of the electrodes were measured.

The hydrogen absorbing-alloy powders for battery according to the above embodiments and comparative examples, PTFE powder and carbon powder were weighed so that they were 95.5 wt %, 4.0 wt % and 0.5 wt %, respectively and then kneaded so that respective electrode sheets were made. The electrode sheets were cut off to a predetermined size and attached under pressure to a nickel collector to make hydrogen absorbing-alloy electrodes.

On the other hand, a paste was prepared by adding a small amount of CMC (carboxymethyl cellulose) and water to 90 wt % of nickel hydroxide and 10 wt % of cobalt monoxide and stirring and mixing them. This paste was filled to a porous nickel member having a three-dimensional structure and dried and rolled by a roller press to make a nickel electrode.

Batteries were assembled by combining the respective hydrogen absorbing-alloy electrodes and a nickel electrode, and their capacities were measured by single-electrode evaluation. On the other hand, AA type nickel-metal hydride batteries of the respective embodiments were actually assembled for battery life evaluation. Here, a solution mixed with 8N potassium hydroxide and 1N lithium hydroxide was used as a battery electrolyte.

In capacity evaluation for the hydrogen absorbing-alloy electrodes, the respective hydrogen absorbing-alloy electrodes were charged up to 400 mAh/g in a constant temperature tank at 25° C. with a current of 220 mA per 1 g (220 mA/g) and discharged with the above current until potential difference of −0.5 V was achieved with respect to an Hg/HgO reference electrode. Values obtained when the maximum discharge values were obtained by repeating the above charge/discharge operation were measured as capacities. After the capacities at 25° C. were measured, the temperature of the constant temperature tank was adjusted to −20° C. and +60° C. and capacities at the respective temperatures were measured. The ratios of the capacities at the respective measurement temperatures to the capacity at 25° C. were calculated to evaluate the temperature dependency of the capacity.

In the battery life evaluation, the respective batteries were charged with 650 mA for 1.5 hours and repeatedly subjected to charge/discharge cycles so that a current was discharged at the current of 1 A until the batteries had a voltage of 1 V and the number of the cycles at which the capacity of the batteries became 80% of an initial capacity was measured as a battery life. The measurement results are shown in Table 1.

TABLE 1

| Specimen No. | A (Rare Earth Elements) Composition (wt %) | | | | | Alloy Composition (Atomic Ratio) | Alloy Manufacturing Method | Hydrogen Equilibrium Pressure (atm) | Capacity (mAh/g) | Life (cycles) | Temperature Dependency of Capacity | |
|---|---|---|---|---|---|---|---|---|---|---|---|---|
| | La | Ce | Pr | Nd | Y | | | | | | C. (−20° C.)/ C. (25° C.) | C. (60° C.)/ C. (25° C.) |
| Embodiment 1 | 68 | 22 | 3 | 7 | 0 | ANi3.60Co0.80Mn0.40Al0.20 | Single Roll | 0.50 | 305 | 300 | 0.30 | 0.96 |
| Embodiment 2 | 72 | 20 | 2 | 6 | 0 | ANi3.60Co0.80Mn0.40Al0.20 | Single Roll | 0.40 | 312 | 280 | 0.32 | 0.98 |
| Embodiment 3 | 75 | 17 | 2 | 6 | 0 | ANi3.75Co0.80Mn0.40Al0.20 | Single Roll | 0.50 | 320 | 260 | 0.35 | 0.96 |
| Embodiment 4 | 82 | 12 | 1 | 5 | 0 | ANi3.80Co0.80Mn0.40Al0.20 | Single Roll | 0.41 | 327 | 240 | 0.38 | 0.98 |
| Embodiment 5 | 89 | 7 | 1 | 3 | 0 | ANi3.80Co0.80Mn0.35Al0.20 | Single Roll | 0.40 | 335 | 220 | 0.42 | 0.98 |
| Embodiment 6 | 68 | 22 | 3 | 7 | 0 | ANi3.60Co0.82Mn0.45Al0.20B0.03 | Single Roll | 0.40 | 300 | 320 | 0.28 | 0.98 |
| Embodiment 7 | 72 | 20 | 2 | 6 | 0 | ANi3.60Co0.82Mn0.45Al0.20Si0.03 | Single Roll | 0.33 | 308 | 300 | 0.27 | 0.98 |
| Embodiment 8 | 75 | 17 | 2 | 6 | 0 | ANi3.70Co0.84Mn0.40Al0.20S0.01 | Single Roll | 0.35 | 314 | 290 | 0.29 | 0.98 |
| Embodiment 9 | 82 | 12 | 1 | 5 | 0 | ANi3.80Co0.83Mn0.40Al0.20Cr0.02 | Single Roll | 0.35 | 320 | 270 | 0.33 | 0.98 |
| Embodiment 10 | 90 | 6 | 1 | 3 | 0 | ANi3.90Co0.82Mn0.35Al0.20Mo0.03 | Single Roll | 0.38 | 328 | 250 | 0.40 | 0.97 |
| Embodiment 11 | 68 | 22 | 3 | 7 | 0 | ANi3.65Co0.73Mn0.35Al0.20Ge0.02 | Single Roll | 0.35 | 306 | 290 | 0.32 | 0.98 |
| Embodiment 12 | 72 | 20 | 2 | 6 | 0 | ANi3.65Co0.73Mn0.35Al0.20Ge0.02 | Single Roll | 0.40 | 311 | 270 | 0.35 | 0.98 |
| Embodiment 13 | 75 | 17 | 2 | 6 | 0 | ANi3.75Co0.74Mn0.30Al0.20Ru0.01 | Single Roll | 0.44 | 319 | 280 | 0.35 | 0.97 |
| Embodiment 14 | 82 | 12 | 1 | 5 | 0 | ANi3.75Co0.74Mn0.25Al0.20Rh0.01 | Single Roll | 0.42 | 328 | 260 | 0.37 | 0.97 |
| Embodiment 15 | 95 | 3 | 0 | 2 | 0 | ANi3.80Co0.74Mn0.20Al0.20Pd0.01 | Single Roll | 0.45 | 334 | 240 | 0.41 | 0.97 |
| Embodiment 16 | 68 | 22 | 3 | 7 | 0 | ANi3.60Co0.50Fe0.27Mn0.40Al0.20In0.03 | Double Roll | 0.52 | 308 | 300 | 0.30 | 0.96 |
| Embodiment 17 | 72 | 20 | 2 | 6 | 0 | ANi3.65Co0.57Fe0.20Mn0.40Al0.20Sn0.03 | Double Roll | 0.50 | 315 | 295 | 0.31 | 0.96 |
| Embodiment 18 | 75 | 17 | 2 | 6 | 0 | ANi3.75Co0.70Cu0.17Mn0.35Al0.20Sb0.03 | Double Roll | 0.48 | 322 | 300 | 0.33 | 0.97 |
| Embodiment 19 | 82 | 12 | 1 | 5 | 0 | ANi3.80Co0.80Fe0.10Mn0.25Al0.20Si0.05 | Double Roll | 0.52 | 331 | 280 | 0.35 | 0.96 |
| Embodiment 20 | 93 | 5 | 1 | 1 | 0 | ANi3.85Co0.80Cu0.10Mn0.22Al0.20B0.03 | Double Roll | 0.46 | 326 | 290 | 0.32 | 0.96 |
| Embodiment 21 | 68 | 22 | 2 | 6 | 2 | ANi3.55Co0.85Mn0.40Al0.20 | Double Roll | 0.50 | 307 | 310 | 0.30 | 0.96 |
| Embodiment 22 | 75 | 13 | 2 | 5 | 5 | ANi3.60Co0.85Mn0.45Al0.20 | Double Roll | 0.47 | 318 | 280 | 0.35 | 0.97 |
| Embodiment 23 | 80 | 7 | 1 | 3 | 9 | ANi3.70Co0.85Mn0.45Al0.20 | Double Roll | 0.32 | 329 | 240 | 0.42 | 0.96 |
| Comparative Example 1 | 45 | 10 | 5 | 40 | 0 | ANi4.00Co0.40Mn0.30Al0.30 | Casting | 0.85 | 275 | 250 | 0.18 | 0.91 |

TABLE 1-continued

| Specimen No. | A (Rare Earth Elements) Composition (wt %) | | | | | Alloy Composition (Atomic Ratio) | Alloy Manufacturing Method | Hydrogen Equilibrium Pressure (atm) | Capacity (mAh/g) | Life (cycles) | Temperature Dependency of Capacity | |
|---|---|---|---|---|---|---|---|---|---|---|---|---|
| | La | Ce | Pr | Nd | Y | | | | | | C.(−20° C.)/C.(25° C.) | C.(60° C.)/C.(25° C.) |
| Comparative Example 2 | 25 | 52 | 13 | 10 | 0 | ANi3.90Co0.60Mn0.30Al0.20 | Casting | 0.80 | 268 | 270 | 0.15 | 0.88 |

As apparent from the results shown in Table 1, in electrodes and batteries formed by using the hydrogen-absorbing alloys according to the respective embodiments prepared by cooling-solidification in such a manner that the composition ratio of the rare earth elements serving as A site components of the general formula and the composition ratio of other constituent elements were properly set, a decrease in capacity under the low-temperature condition of −20° C. and the high-temperature condition of +60° C. was smaller than that in the batteries of the comparative examples in which a composition ratio or a hydrogen equilibrium pressure was different from that of the batteries of the embodiments. Therefore, it was found that the temperature dependency of the capacity was low in a wide use temperature range.

When the embodiments were compared with the comparative examples, an electrode capacity was increased by 25–67 mAh/g, and the number of charge/discharge cycles was increased by about 50. As a result, it was confirmed that the battery life was increased. More specifically, it was found that when the compositions and hydrogen equilibrium pressures were set within the ranges defined in these embodiments, secondary nickel-metal hydride batteries each having a low temperature dependency, a large capacity and a long life could be obtained.

Embodiments 24–35

Various metal material powders were mixed with each other to obtain A component (Lm) composition and alloy compositions shown in left columns of Table 2, and the obtained mixtures of various materials were heated and melted in a vacuum furnace to prepare molten alloys (mother alloys) for respective embodiments.

The obtained molten alloys were cooled and solidified in an Ar atmosphere in accordance with the following conditions to prepare block-shaped or flake-shaped alloy specimens.

More specifically, the molten alloys for Embodiments 24–27 were poured onto Cu rotating discs to be cooled and solidified at a cooling rate of 300° C./sec, thereby preparing alloy specimens each having a thickness of 10 μm for Embodiments 24–27. Further, the obtained alloy specimens were heated at 1,000° C. for 10 hours to perform a homogenization heat treatment to the alloy specimens.

On the other hand, the molten alloys for Embodiments 28–31 were rapidly quenched and solidified by a single roll method as shown in FIG. 1 to prepare respective flake-shaped alloy specimens. A Cu-Be roll having a diameter of 400 mm was used as a cooling roll, the gap between a molten-pouring nozzle (injection nozzle) was set to 20 mm, and an injection pressure was set to 0.5 kg/cm². The rapidly-quenching operation was performed in an Ar atmosphere, and the peripheral speed of the cooling roll was set to 25 m/s.

The molten alloys for Embodiments 32–35 were rapidly quenched and solidified by a double roll method as shown in FIG. 2 to prepare respective flake-shaped alloy specimens. A treatment atmosphere in the double roll method was an Ar gas atmosphere as in case of the single roll method. The material of the cooling rolls was Fe (SKD61), and iron rolls each having a diameter of 300 mm were used. The roll gap between the cooling rolls was set to zero, the peripheral speed of each roll was set to 10 m/s, and an injection pressure was set to 0.5 kg/cm².

Among rapidly-quenched alloy specimens, the rapidly-quenched alloy specimens manufactured by the single roll method and the double roll method were flake-shapes, and their thicknesses were 40–60 μm. These flake-shaped alloy specimens were subjected to a homogenization heat treatment at 500° C. for 3 hours thereby to remove internal distortion therefrom.

Comparative Example 3–5

Material powders were mixed with each other to satisfy misch metal (Lm) compositions and alloy compositions shown in left columns in Table 1, the obtained mixtures of material powders were heated and melted in a vacuum furnace to prepare molten alloys for respective comparative examples. Note, among the material powders, as a misch metal (Lm) serving as the A component, a misch metal whose La content was excessively small and a misch metal whose Nb content was excessively large were used.

The obtained molten alloys were cooled and solidified by a casting method at a quenching rate set to 5°–20° C./sec to prepare block-like alloy specimens each having a thickness of 50 mm according to Comparative Examples 3–5. Further, the obtained alloy specimens were heated at 1,000° C. for 10 hours to perform a homogenization heat treatment to the alloy specimens.

The obtained alloy specimens were pulverized by a hammer mill, and the pulverized powders were screened to be classified into powders having a grain size of 75 μm or less, thereby obtaining hydrogen absorbing-alloy powders for battery. Note that the average grain size of the alloy powder was 35–40 μm.

To evaluate the characteristics of the hydrogen-absorbing alloys for battery according to the above embodiments and comparative examples serving as battery materials, the electrodes were formed by using the hydrogen-absorbing alloys for battery in the same procedures as in Embodiments 1–23, and electrode capacities and the numbers of charge/discharge cycles (life cycles) of the electrodes were measured. The measurement results are shown in Table 2. The measurement results of quenching rates from when the molten alloys are melted are also shown in Table 2.

TABLE 2

| Specimen No. | A Composition (wt %) La | Nd | Pr | Ce | Alloy Composition (Atomic Ratio) | Alloy Manufacturing Method | Quenching Rate (°C./sec) | Capacity (mAh/g) | Life (cycles) |
|---|---|---|---|---|---|---|---|---|---|
| Embodiment 24 | 80 | 1 | 4 | 15 | ANi3.90Co0.8Fe0.05Mn0.20Al0.15 | Rotating Disc | 300 | 315 | 320 |
| Embodiment 25 | 78 | 4 | 3 | 13 | ANi3.75Co1.0Mn0.20Al0.15 | Rotating Disc | 300 | 320 | 310 |
| Embodiment 26 | 84 | 1 | 2 | 13 | ANi3.55Co1.3Cu0.02Mn0.10Al0.10 | Rotating Disc | 300 | 320 | 320 |
| Embodiment 27 | 88 | 0 | 8 | 2 | ANi3.75Co1.5Cr0.03Mn0.10Al0.05 | Rotating Disc | 300 | 305 | 340 |
| Embodiment 28 | 80 | 1 | 9 | 10 | ANi3.88Co0.8Si0.02Mn0.15Al0.15 | Single Roll | 2500 | 320 | 320 |
| Embodiment 29 | 78 | 4 | 3 | 13 | ANi3.70Co1.0Mn0.15Al0.15 | Single Roll | 3500 | 310 | 340 |
| Embodiment 30 | 84 | 1 | 2 | 13 | ANi3.42Co1.3Nb0.03Mn0.15Al0.10 | Single Roll | 4000 | 305 | 350 |
| Embodiment 31 | 88 | 0 | 8 | 2 | ANi3.27Co1.5Mo0.03Mn0.10Al0.10 | Single Roll | 3000 | 315 | 360 |
| Embodiment 32 | 80 | 1 | 7 | 12 | ANi3.90Co0.8Mn0.20Al0.10 | Double Roll | 3000 | 320 | 320 |
| Embodiment 33 | 78 | 4 | 3 | 13 | ANi3.85Co1.0W 0.05Mn0.15Al0.10 | Double Roll | 3000 | 330 | 300 |
| Embodiment 34 | 84 | 1 | 2 | 13 | ANi3.45Co1.3Ta0.02Mn0.15Al0.10 | Double Roll | 3000 | 320 | 320 |
| Embodiment 35 | 88 | 0 | 8 | 2 | ANi3.25Co1.5Sn0.01Mn0.15Al0.10 | Double Roll | 3000 | 310 | 350 |
| Comparative Example 3 | 45 | 40 | 10 | 5 | ANi4.20Co0.4Mn0.30Al0.20 | Casting | 1 | 260 | 200 |
| Comparative Example 4 | 60 | 30 | 8 | 4 | ANi4.10Co0.5Mn0.20Al0.20 | Casting | 0.5 | 275 | 180 |
| Comparative Example 5 | 75 | 10 | 10 | 5 | ANi4.00Co0.6Mn0.30Al0.10 | Casting | 0.1 | 270 | 190 |

As apparent from the results shown in Table 2, in electrodes and batteries formed by using the hydrogen-absorbing alloys according to the respective embodiments prepared by cooling-solidification in such a manner that the composition ratio of the rare earth elements serving as A site components of the general formula and the composition ratio of other constituent elements were properly set, an electrode capacity was increased by 30–70 mAh/g, the number of charge/discharge cycles was increased by about 100–180 and the battery life was considerably extended in comparison with the batteries of the comparative examples in which a composition ratio was different from that of the batteries of the embodiments.

More specifically, it was found that when the compositions and quenching rates were set within the ranges defined in these embodiments, secondary nickel-metal hydride batteries each having a large capacity and a long life could be obtained.

As has been described above, in a hydrogen-absorbing alloy for battery according to the present invention, since the types of rare earth elements constituting the alloy and the composition ratio of the rare earth elements and the type of an element to be substituted for Ni and the composition ratio of the element are properly set, a hydrogen-absorbing alloy for battery having a low temperature dependency, hydrogen-absorbing characteristics and corrosion resistance which are excellent can be obtained. Therefore, when the alloy is used as a negative electrode material, there can be provided a secondary nickel-metal hydride battery having a small decrease in capacity under the low-temperature condition and high-temperature condition, a large battery capacity in a wide temperature range, and a long life.

What is claimed is:

1. A hydrogen-absorbing alloy for battery comprising a quenched alloy having a composition represented by a general formula $ANi_aM_bM'_cT_d$ (where, A is composed of La, Ce, Pr, Nd and Y, an amount of La content in A is 50–99 wt %, an amount of Ce content is 1–30 wt %, an amount of Pr content is 0–10 wt %, an amount of Nd content is 0–10 wt % and an amount of Y content is 0–10 wt %; M is at least one element selected from Co, Fe and Cu; M' is at least one element selected from Mn and Al; T is at least one element selected from B, Si, S, Cr, Ga, Ge, Mo, Ru, Rh, Pd, Ag, In, Sn, Sb, Bi, P, V, Nb, Ta and W; and a, b, c and d are atomic ratios and satisfy $3.2 \leq a \leq 4.0$, $0.4 \leq b \leq 1.5$, $0.3 \leq c \leq 0.9$, $0 \leq d \leq 0.2$, $4.5 \leq a+b+c+d \leq 5.6$), wherein said quenched alloy is formed by being quenched at a quenching rate of 100° C./sec or more, and having a hydrogen equilibrium pressure of 0.05–0.6 atm when the number of hydrogen atoms absorbed by one atom of said alloy at a temperature of 60° C. is 0.4.

2. A hydrogen-absorbing alloy for battery according to claim 1, wherein the sum of the atomic ratios a, b, c and d is set within the range of 4.9–5.4.

3. A hydrogen-absorbing alloy for battery according to claim 1, wherein said hydrogen-absorbing alloy contains 0.5–1.5 of Co, 0.1–0.5 of Mn and 0.1–0.4 of Al as atomic ratios.

4. A hydrogen-absorbing alloy for battery according to claim 1, wherein an average crystal grain size of said quenched alloy is set within the range of 5–100 μm.

5. A hydrogen-absorbing alloy for battery comprising an alloy having a composition represented by a general formula $AB_x$ (where A is composed of La, Ce, Pr and Nd, an amount of La content in A is set within the range of 70–90 wt %, and an amount of Nd content is set to 5 wt % or less; B is at least one element selected from Ni, Co, Fe, Cr, Mn, Cu, Al, Ga, Si, Ge, Bi, Sn, In, P, V, Nb, Ta, Mo and W; and X is an atomic ratio which satisfies $4.5 \leq X \leq 5.6$), wherein said alloy is formed by being quenched at a quenching rate of 100°/sec or more, and having a hydrogen equilibrium pressure of 0.05–0.6 atm when the number of hydrogen atoms absorbed by one atom of said alloy at a temperature of 60° C. is 0.4.

6. A secondary nickel-metal hydride battery including a negative electrode containing a hydrogen-absorbing alloy and a positive electrode containing nickel oxide each disposed through a separator having electric insulating properties and contained in an air-tight container filled with an alkaline battery electrolyte, wherein said hydrogen-absorbing alloy comprises an alloy having the composition represented by a general formula $ANi_aM_bM'_cT_d$ (where, A is composed of La, Ce, Pr, Nd and Y, an amount of La content in A is 50–99 wt %, an amount of Ce content is 1–30 wt %, an amount of Pr content is 0–10 wt %, an amount of Nd content is 0–10 wt % and an amount of Y content is 0–10 wt %; M is at least one element selected from Co, Fe and Cu; M' is at least one element selected from Mn and Al; T is at least one element selected from B, Si, S, Cr, Ga, Ge, Mo, Ru, Rh, Pd, Ag, In, Sn, Sb, Bi, P, V, Nb, Ta and W; and a, b, c and d are atomic ratios and satisfy $3.2 \leq a \leq 4.0$, $0.4 \leq b \leq 1.5$, $0.3 \leq c \leq 0.9$, $0 \leq d \leq 0.2$, $4.5 \leq a+b+c+d \leq 5.6$), wherein said hydrogen absorbing alloy is formed by being quenched at a quenching rate of 100° C./sec or more, and having a hydrogen equilibrium pressure of 0.05–0.6 atm when the number of hydrogen atoms absorbed by one atom of said alloy at a temperature of 60° C. is 0.4.

7. A secondary nickel-metal hydride battery including a negative electrode containing a hydrogen-absorbing alloy and a positive electrode containing nickel oxide each disposed through a separator having electric insulating properties and contained in an air-tight container filled with an alkaline battery electrolyte, wherein a hydrogen-absorbing alloy comprises an alloy having the composition represented by a general formula $AB_x$ (where, A is composed of La, Ce, Pr and Nd, an amount of La content in A is 70–99 wt % and an amount of Nd content is not more than 5 wt %; and B is at least one element selected from Ni, Co, Fe, Cr, Mn, Cu, Al, Ga, Si, Ge, Bi, Sn, In, P, V, Nb, Ta, Mo and W; and X is an atomic ratio which satisfies $4.5 \leq X \leq 5.6$), wherein said alloy is formed by being quenched at a quenching rate of 100° C./sec or more, and having a hydrogen equilibrium pressure of 0.05–0.6 atm when the number of hydrogen atoms absorbed by one atom of said alloy at a temperature of 60° C. is 0.4.

* * * * *